United States Patent
Saulsbury et al.

(10) Patent No.: US 7,558,816 B2
(45) Date of Patent: Jul. 7, 2009

(54) METHODS AND APPARATUS FOR PERFORMING PIXEL AVERAGE OPERATIONS

(75) Inventors: Ashley Saulsbury, Los Altos, CA (US); Daniel S. Rice, Oakland, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1592 days.

(21) Appl. No.: 09/992,064

(22) Filed: Nov. 21, 2001

(65) Prior Publication Data

US 2003/0097389 A1    May 22, 2003

(51) Int. Cl.
*G06F 7/38* (2006.01)
(52) U.S. Cl. ..................................... 708/445
(58) Field of Classification Search ................ 708/445, 708/446, 160, 551, 200, 202
See application file for complete search history.

(56) References Cited

U.S. PATENT DOCUMENTS

| | | | | |
|---|---|---|---|---|
| 4,040,052 A | * | 8/1977 | Stanislaw | 708/445 |
| 4,542,456 A | | 9/1985 | Hill | |
| 4,941,190 A | * | 7/1990 | Joyce | 382/264 |
| 5,276,634 A | * | 1/1994 | Suzuki et al. | 708/497 |
| 5,710,732 A | * | 1/1998 | Wong | 708/445 |
| 5,774,600 A | * | 6/1998 | Strongin et al. | 382/276 |
| 5,844,830 A | * | 12/1998 | Gorshtein et al. | 708/495 |
| 5,883,824 A | * | 3/1999 | Lee et al. | 708/445 |
| 5,909,572 A | | 6/1999 | Thayer et al. | |
| 6,099,158 A | * | 8/2000 | Gorshtein et al. | 708/505 |
| 6,512,523 B1 | * | 1/2003 | Gross | 708/445 |
| 6,687,771 B2 | * | 2/2004 | Symes | 708/313 |
| 6,889,242 B1 | * | 5/2005 | Sijstermans et al. | 708/551 |

FOREIGN PATENT DOCUMENTS

| | | |
|---|---|---|
| WO | WO 01/67235 A2 | 9/2001 |
| WO | WO 01/67238 A1 | 9/2001 |

OTHER PUBLICATIONS

Ruby B. Lee, Hewlett-Packard, *Subword Parallelism with MAX-2*, (Aug. 1996) IEEE.
Sun Microelectronics, *VIS™ Instruction Set User's Manual*, Sun Microsystems, Inc., Part No. 805-1394-01, (Jul. 1997), pp. 1-136.
Microelectronics, Hardward & Networking, *UltraSPARC™ The Visual Instruction Set (VIS™): On Chip Support for New-Media Processing*, Sun Microsystems, White Paper, downloaded from the Internet: http://www.sun.com/microelectronics/whitepapers/ wp95-022, on Jun.4, 1999.
*VIS™ Instruction Set User's Manual*, Sun Microsystems, Inc., (Mar. 2000), pp. 25-74.

* cited by examiner

*Primary Examiner*—Chat C Do
(74) *Attorney, Agent, or Firm*—Dorsey & Whitney LLP

(57) ABSTRACT

According to the invention, a process for averaging two pixel values is disclosed. In one step, an instruction is decoded. A plurality of first operands is loaded from a first input register. A plurality of second operands is loaded from a second input register. An average of one of the plurality of first operands and one of the plurality of second operands is produced. The average is stored in an output register.

21 Claims, 8 Drawing Sheets

METHODS AND APPARATUS FOR PERFORMING PIXEL AVERAGE OPERATIONS

CROSS-REFERENCES TO RELATED APPLICATIONS

This application is related to U.S. pat. application Ser. No 09/991,628 dated Nov. 21, 2001, entitled "Methods and Apparatus for Performing Parallel Integer Multiply Accumulate Operations" which is incorporated herein by reference.

BACKGROUND OF THE INVENTION

The present invention relates generally to an improved computer processing instruction set, and more particularly to an instruction set having a pixel average functionality.

Computer architecture designers are constantly trying to increase the speed and efficiency of computer processors. For example, computer architecture designers have attempted to increase processing speeds by increasing clock speeds and attempting latency hiding techniques, such as data prefetching and cache memories. In addition, other techniques, such as instruction-level parallelism using VLIW, multiple-issue superscalar, speculative execution, scoreboarding, and pipelining are used to further enhance performance and increase the number of instructions issued per clock cycle (IPC).

Architectures that attain their performance through instruction-level parallelism seem to be the growing trend in the computer architecture field. Examples of architectures utilizing instruction-level parallelism include single instruction multiple data (SIMD) architecture, multiple instruction multiple data (MIMD) architecture, vector or array processing, and very long instruction word (VLIW) techniques. Of these, VLIW appears to be the most suitable for general purpose computing. However, there is a need to further improve architectures to increase efficiency.

Video processing frequently requires averaging of pixels. For example, when a frame moves a half pixel in one direction, adjacent pixels are averaged to calculate how to display the moved frame. Additionally, compression algorithms such as MPEG video compression and H.261 video conferencing standard require averaging of pixels. As those skilled in the art can appreciate, increasing the performance of pixel averaging could increase the speed of video processing.

Conventional systems calculate pixel averages in software by following an add operation by a shift operation. The shift operation serves to effectively divide the intermediate sum by two. Typically, only two pixels are averaged at a time using this algorithm. Large images with fast frame display rates can require performing a large number of pixel averages. For example, 720×576 pixel image has over four hundred thousand pixels that would require recalculation if the image moved a fraction of a pixel. Accordingly, there is a general need to increase the performance of pixel averaging.

BRIEF DESCRIPTION OF THE DRAWINGS

The present invention is hereinafter described in conjunction with the appended drawing figure(s).

DESCRIPTION OF THE SPECIFIC EMBODIMENTS

Introduction

The present invention provides a novel computer processor chip having a sub-instruction for performing pixel average functions in parallel. As one skilled in the art will appreciate, performing multiple pixel average functions in a single instruction issue increases efficiency. Additionally, rounding the average up or down is possible in each sub-instruction to accommodate different rounding methodologies.

In the Figures, similar components and/or features have the same reference label. Further, various components of the same type are distinguished by following the reference label by a dash and a second label that distinguishes among the similar components. If only the first reference label is used in the specification, the description is applicable to any one of the similar components having the second label.

Processor Overview

Figure 1:
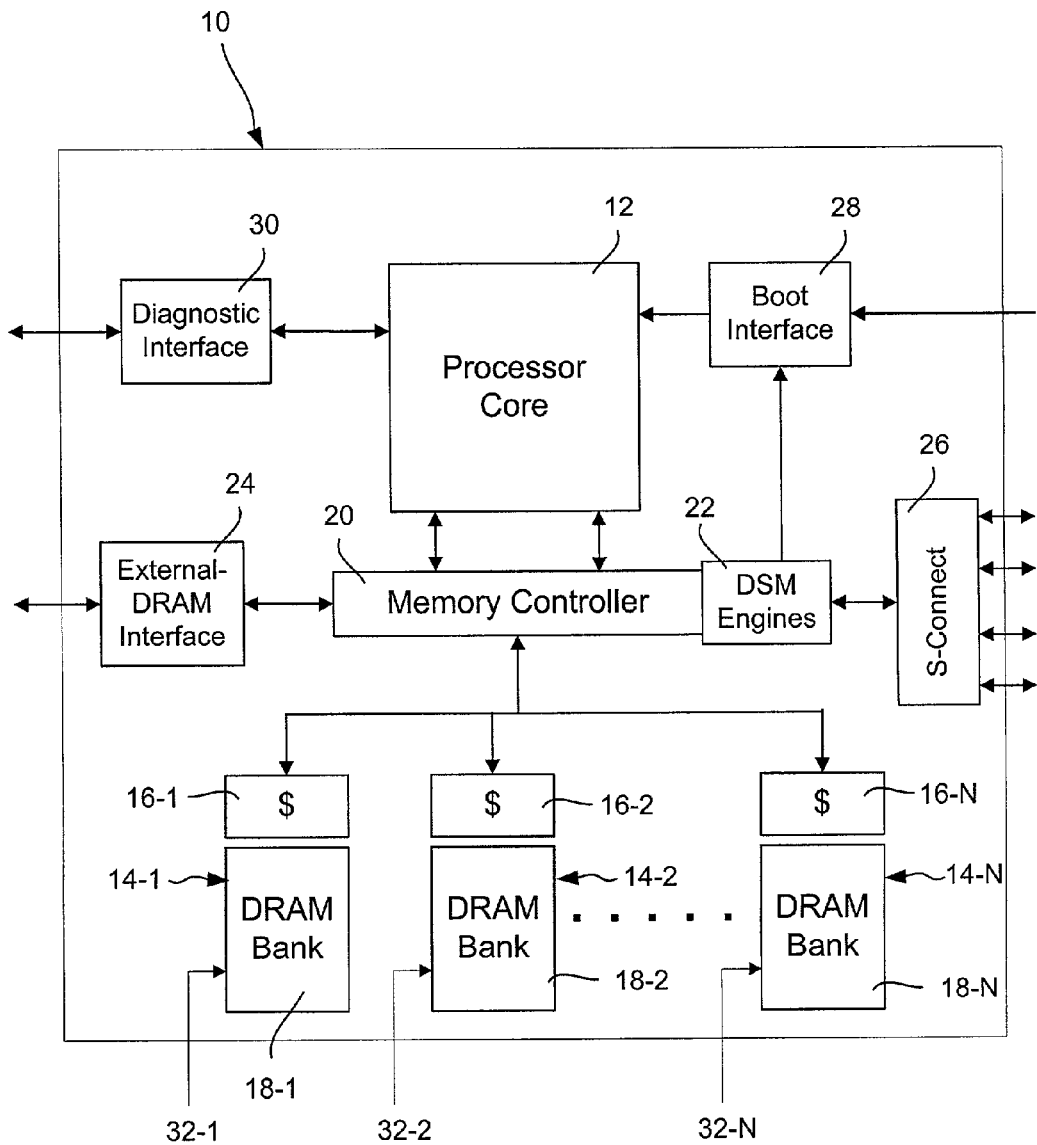
FIG. 1 is a block diagram of an embodiment of a processor chip having the processor logic and memory on the same integrated circuit.

With reference to FIG. 1, a processor chip 10 is shown which embodies the present invention. In particular, processor chip 10 comprises a processing core 12, a plurality of memory banks 14, a memory controller 20, a distributed shared memory controller 22, an external memory interface 24, a high-speed I/O link 26, a boot interface 28, and a diagnostic interface 30.

As discussed in more detail below, processing core 12 comprises a scalable VLIW processing core, which may be configured as a single processing pipeline or as multiple processing pipelines. The number of processing pipelines typically is a function of the processing power needed for the particular application. For example, a processor for a personal workstation typically will require fewer pipelines than are required in a supercomputing system.

In addition to processing core 12, processor chip 10 comprises one or more banks of memory 14. As illustrated in FIG. 1, any number of banks of memory can be placed on processor chip 10. As one skilled in the art will appreciate, the amount of memory 14 configured on chip 10 is limited by current silicon processing technology. As transistor and line geometries decrease, the total amount of memory that can be placed on a processor chip 10 will increase.

Connected between processing core 12 and memory 14 is a memory controller 20. Memory controller 20 communicates with processing core 12 and memory 14, and handles the memory I/O requests to memory 14 from processing core 12 and from other processors and I/O devices. Connected to memory controller 20 is a distributed shared memory (DSM) controller 22, which controls and routes I/O requests and data messages from processing core 12 to off-chip devices, such as other processor chips and/or I/O peripheral devices. In addition, as discussed in more detail below, DSM controller 22 is configured to receive I/O requests and data messages from off-chip devices, and route the requests and messages to memory controller 20 for access to memory 14 or processing core 12.

High-speed I/O link 26 is connected to the DSM controller 22. In accordance with this aspect of the present invention, DSM controller 22 communicates with other processor chips and I/O peripheral devices across the I/O link 26. For example, DSM controller 22 sends I/O requests and data messages to other devices via I/O link 26. Similarly, DSM controller 22 receives I/O requests from other devices via the link.

Processor chip 10 further comprises an external memory interface 24. External memory interface 24 is connected to memory controller 20 and is configured to communicate memory I/O requests from memory controller 20 to external memory. Finally, as mentioned briefly above, processor chip 10 further comprises a boot interface 28 and a diagnostic interface 30. Boot interface 28 is connected to processing core 12 and is configured to receive a bootstrap program for cold booting processing core 12 when needed. Similarly, diagnostic interface 30 also is connected to processing core 12 and configured to provide external access to the processing core for diagnostic purposes.

Processing Core

1. General Configuration

As mentioned briefly above, processing core 12 comprises a scalable VLIW processing core, which may be configured as a single processing pipeline or as multiple processing pipelines. A single processing pipeline can function as a single pipeline processing one instruction at a time, or as a single VLIW pipeline processing multiple sub-instructions in a single VLIW instruction word. Similarly, a multi-pipeline processing core can function as multiple autonomous processing cores. This enables an operating system to dynamically choose between a synchronized VLIW operation or a parallel multi-threaded paradigm. In multi-threaded mode, the VLIW processor manages a number of strands executed in parallel.

In accordance with one embodiment of the present invention, when processing core 12 is operating in the synchronized VLIW operation mode, an application program compiler typically creates a VLIW instruction word comprising a plurality of sub-instructions appended together, which are then processed in parallel by processing core 12. The number of sub-instructions in the VLIW instruction word matches the total number of available processing paths in the processing core pipeline. Thus, each processing path processes VLIW sub-instructions so that all the sub-instructions are processed in parallel. In accordance with this particular aspect of the present invention, the sub-instructions in a VLIW instruction word issue together in this embodiment. Thus, if one of the processing paths is stalled, all the sub-instructions will stall until all of the processing paths clear. Then, all the sub-instructions in the VLIW instruction word will issue at the same time. As one skilled in the art will appreciate, even though the sub-instructions issue simultaneously, the processing of each sub-instruction may complete at different times or clock cycles, because different sub-instruction types may have different processing latencies.

In accordance with an alternative embodiment of the present invention, when the multi-pipelined processing core is operating in the parallel multi-threaded mode, the program sub-instructions are not necessarily tied together in a VLIW instruction word. Thus, as instructions are retrieved from an instruction cache, the operating system determines which pipeline is to process each sub-instruction for a strand. Thus, with this particular configuration, each pipeline can act as an independent processor, processing a strand independent of strands in the other pipelines. In addition, in accordance with one embodiment of the present invention, by using the multi-threaded mode, the same program sub-instructions can be processed simultaneously by two separate pipelines using two separate blocks of data, thus achieving a fault tolerant processing core. The remainder of the discussion herein will be directed to a synchronized VLIW operation mode. However, the present invention is not limited to this particular configuration.

2. Very Long Instruction Word (VLIW)

Figure 2:
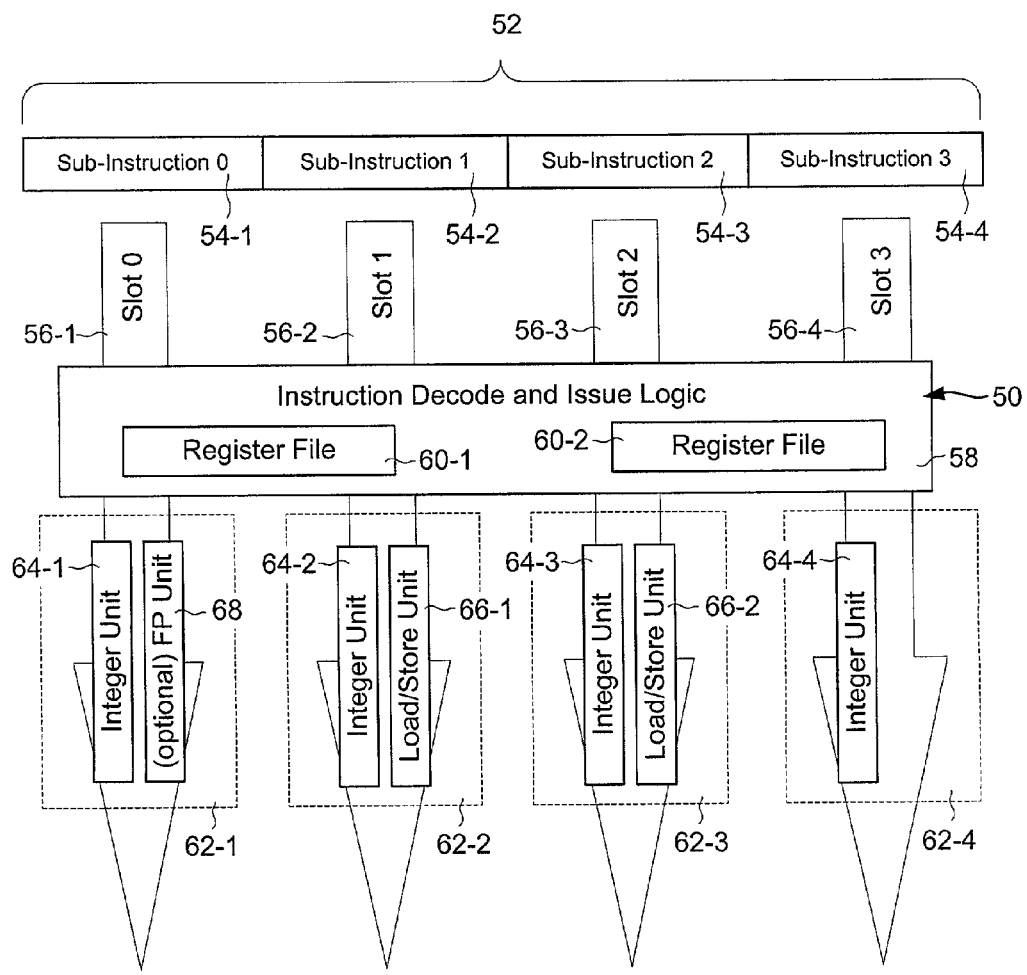
FIG. 2 is block diagram illustrating one embodiment of a processing core having a four-way VLIW pipeline design.

Referring now to FIG. 2, a simple block diagram of a VLIW processing core pipeline 50 having four processing paths, 56-1 to 56-4, is shown. In accordance with the illustrated embodiment, a VLIW 52 comprises four RISC-like sub-instructions, 54-1, 54-2, 54-3, and 54-4, appended together into a single instruction word. For example, an instruction word of one hundred and twenty-eight bits is divided into four thirty-two bit sub-instructions. The number of VLIW sub-instructions 54 correspond to the number of processing paths 56 in processing core pipeline 50. Accordingly, while the illustrated embodiment shows four sub-instructions 54 and four processing paths 56, one skilled in the art will appreciate that the pipeline 50 may comprise any number of sub-instructions 54 and processing paths 56. Typically, however, the number of sub-instructions 54 and processing paths 56 is a power of two.

Each sub-instruction 54 in this embodiment corresponds directly with a specific processing path 56 within the pipeline 50. Each of the sub-instructions 54 are of similar format and operate on one or more related register files 60. For example, processing core pipeline 50 may be configured so that all four sub-instructions 54 access the same register file, or processing core pipeline 50 may be configured to have multiple register files 60. In accordance with the illustrated embodiment of the present invention, sub-instructions 54-1 and 54-2 access register file 60-1, and sub-instructions 54-3 and 54-4 access register file 60-2. As those skilled in the art can appreciate, such a configuration can help improve performance of the processing core.

As illustrated in FIG. 2, an instruction decode and issue logic stage 58 of the processing core pipeline 50 receives VLIW instruction word 52 and decodes and issues the sub-instructions 54 to the appropriate processing paths 56. Each sub-instruction 54 then passes to the execute stage of pipeline 50 which includes a functional or execute unit 62 for each processing path 56. Each functional or execute unit 62 may comprise an integer processing unit 64, a load/store processing unit 66, a floating point processing unit 68, or a combination of any or all of the above. For example, in accordance with the particular embodiment illustrated in FIG. 2, the execute unit 62-1 includes an integer processing unit 64-1 and a floating point processing unit 68; the execute unit 62-2 includes an integer processing unit 64-2 and a load/store processing unit 66-1; the execute unit 62-3 includes an integer processing unit 64-3 and a load/store unit 66-2; and the execute unit 62-4 includes only an integer unit 64-4.

As one skilled in the art will appreciate, scheduling of sub-instructions within a VLIW instruction word 52 and scheduling the order of VLIW instruction words within a program is important so as to avoid unnecessary latency problems, such as load, store and writeback dependencies. In accordance with the one embodiment of the present invention, the scheduling responsibilities are primarily relegated to the software compiler for the application programs. Thus, unnecessarily complex scheduling logic is removed from the processing core, so that the design implementation of the processing core is made as simple are possible. Advances in compiler technology thus result in improved performance without redesign of the hardware. In addition, some particular processing core implementations may prefer or require certain types of instructions to be executed only in specific pipeline slots or paths to reduce the overall complexity of a given device. For example, in accordance with the embodiment illustrated in FIG. 2, since only processing path 56-1, and in particular execute unit 62-1, include a floating point processing unit 68, all floating point sub-instructions are dispatched through path 56-1. As discussed above, the compiler is responsible for handling such issue restrictions in this embodiment.

In accordance with a one embodiment of the present invention, all of the sub-instructions 54 within a VLIW instruction word 52 issue in parallel. Should one of the sub-instructions 54 stall (i.e., not issue), for example due to an unavailable resource, the entire VLIW instruction word 52 stalls until the particular stalled sub-instruction 54 issues. By ensuring that all sub-instructions within a VLIW instruction word 52 issue simultaneously, the implementation logic is dramatically simplified.

3. Data Types

The registers within the processor chip are arranged in varying data types. By having a variety of data types, different data formats can be held in a general purpose register. For example, there may be different data types associated with signed integer, unsigned integer, floating point, and fixed point values. Additionally, a register may be subdivided or partitioned to hold a number of values in separate fields. As can be appreciated, single instruction multiple data (SIMD) sub-instructions utilize registers that hold a number of operators in separate fields.

Figure 3:
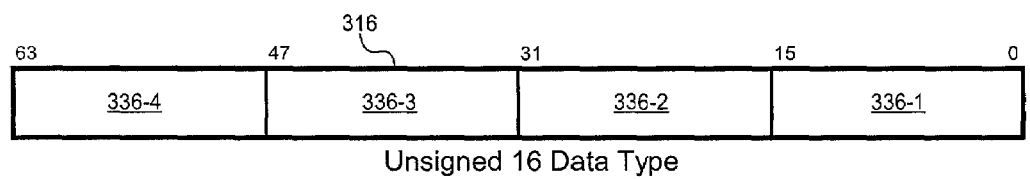
FIG. 3 is a diagram showing some data types generally available to the processor chip.
Figure 3:
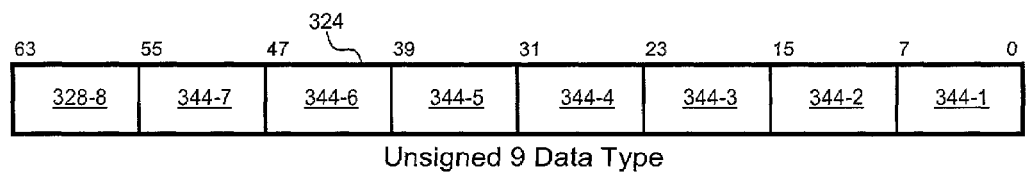

With reference to FIG. 3, some of the data types 316, 324 available for the pixel average sub-instructions are shown. In this embodiment, the registers are sixty-four bits wide. The registers are subdivided into fields in order to hold multiple values. For example, the unsigned 16 data type 316 has a first through fourth fields 336-1, 336-2, 336-3, 336-4 that each hold an operand. In this embodiment, the IEEE standards for fixed point registers (i.e., ANSI/IEEE std 754-1985) are used for any fixed point data types. As those skilled in the art appreciate, there are other possible data types and this invention is not limited to those described above. For example, the registers could be larger than sixty-four bits and hold multiple operands having sizes of eight, sixteen, thirty-two, sixty-four, or one hundred and twenty-eight bits. Further, the operands could be integers, fixed point, floating point, or two's complement values.

Although there are a number of different data types, a given sub-instruction 54 may only utilize a subset of these. For example, one embodiment of the pixel average sub-instruction may only utilize unsigned data types. However, other embodiments could use different data types.

4. Pixel Average Sub-Instruction

Figure 4:
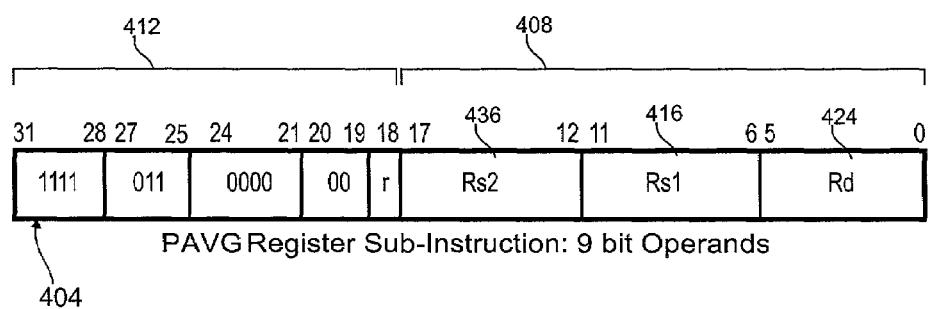
FIG. 4 is a diagram showing an embodiment of machine code syntax for a parallel pixel average sub-instruction.

Referring next to FIG. 4, the machine code for a pixel average sub-instruction ("PAVG") 404 is shown. This sub-instruction 404 uses the register addressing form where Rs1 is a first input operand 416, Rs2 is a second input operand 420, and Rd is an output operand 424. The pixel average sub-instruction 404 is thirty-two bits wide such that a four-way VLIW processor with an one hundred and twenty-eight bit wide instruction word 52 can accommodate execution of four sub-instructions 404 at a time. The sub-instruction 404 is divided into an address and op code portions 408, 412. Generally, the address portion 408 contains the information needed to load and store the operators, while the op code portion 412 indicates the function to perform upon the operators.

The pixel average sub-instruction 404 uses the register addressing format to reference three general purpose registers. A first and second source addresses 416, 420 are used to load a first and second source registers from the register file 60. A destination address 424 is used to indicate where to store the results into a general-purpose destination register. Since each register address 416, 420, 424 has six bits in this embodiment, sixty-four registers are possible in an on-chip register file 60. Loads and stores are performed with the on-chip register file 60. However, other embodiments could allow addressing registers outside the processing core 12.

Bits 31-18 of the sub-instruction 404 are the op codes 412 that are used by the processing core 12 to execute the sub-instruction 54. Decode logic 58 interprets the op codes 412 to configure the processing core 12 to implement the desired instruction. Various sub-instructions 54 may have different amounts of bits devoted to op codes 412.

The rounding factor, r, of the op code 408 is located at bit 18 and indicate the way to round the average before storage in the output register. When the rounding factor is one, the result is rounded up and rounded down when the rounding factor is zero. As will be explained further below, the rounding factor is summed with the first and second operands before dividing by two to produce the average.

Typically, a compiler is used to convert assembly language or high level languages into machine code that contains op codes. As is understood by those skilled in the art, the op codes control multiplexors, other combinatorial logic and registers to perform a predetermined function. Furthermore, those skilled in the art appreciate there could be many different ways to implement op codes.

5. Pixel Average Implementation

Figure 5:
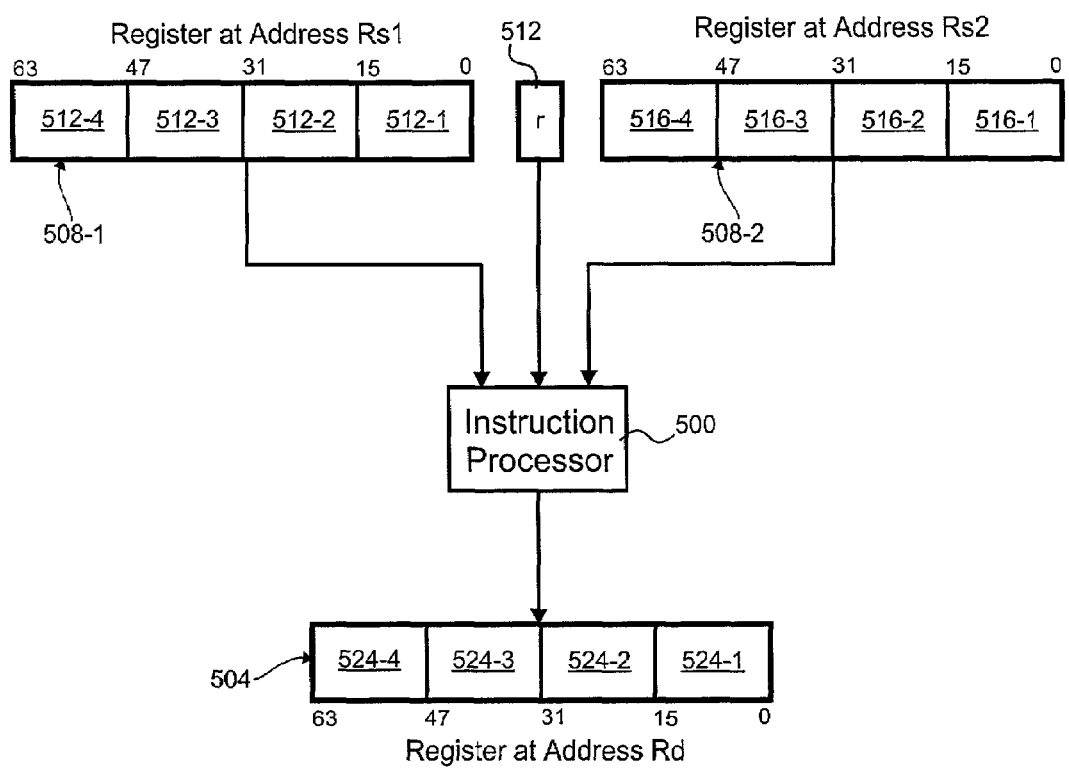
FIG. 5 is a block diagram that schematically illustrates an embodiment of a pixel average instruction processor.

The pixel average sub-instruction allows calculating an average of pixels more quickly by using parallelism. An embodiment of the pixel average function is shown in the block diagram of FIG. 5. There are two input registers 508 and one output register 504 in this embodiment. An instruction processor 500, coupled to the registers 504, 508, and rounding factor 512 loads the input operands from the input registers 508, performs the pixel average function and stores the results in the output register 504. As those skilled in the art can appreciate, the pixel average function may take more than one clock cycle to complete, however, pipelining can be used to reduce the effective latency to one clock cycle.

In this embodiment, each input and output register 504, 508 is sub-divided to hold a number of operands. The registers 504, 508 are sixty-four bits wide and hold four operands 512, 516, 520, 524 each. All the operands 512, 516, 520, 524 are sixteen bits in length. However, other embodiments could use different size registers and operands.

Figure 6:
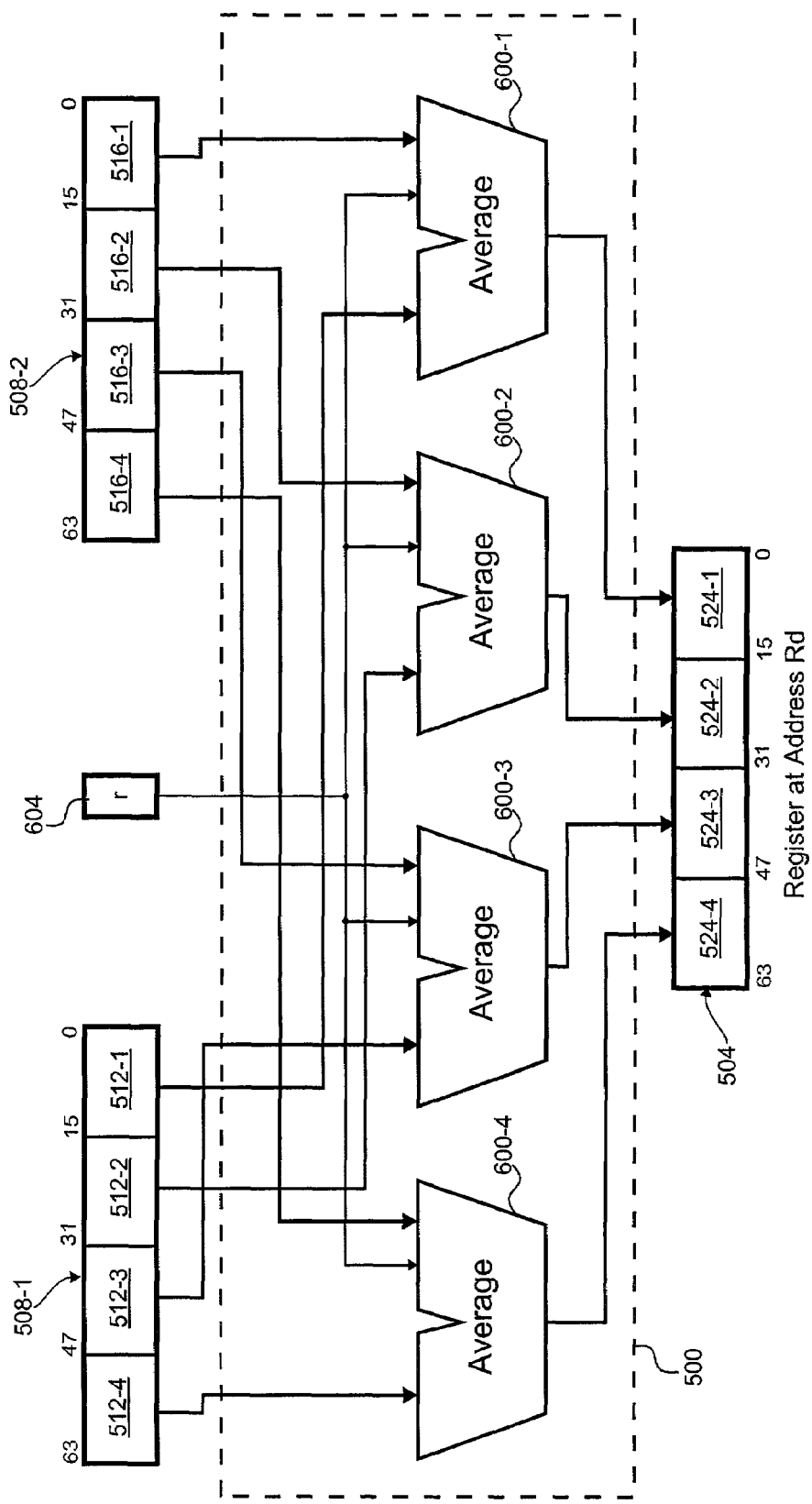
FIG. 6 is a block diagram that schematically shows another embodiment of a pixel average instruction processor.

Referring next to FIG. 6, a block diagram is shown of an embodiment that depicts data flow into a number of pixel average functions 600 that comprise the instruction processor 500. The depicted instruction processor 500 has four pixel average functions 600, however, other embodiments could have a different number of pixel average functions 600. The input operands 512, 516 are read from the input registers 508 and coupled to their respective pixel average function 600 along with a rounding factor 604. The result from each pixel average function 600 is written to the output register 504. For example, the first pixel average function 600-1 loads an operator 512-1 from the first input register 508-1 and loads an operator 516-1 from the second input register 508-2. After processing, the result 524-1 is written to the output register 504. The input operators 512-1, 516-1 and output operator 524-1 for this example occupy the first sixteen bits of their respective registers 508, 504.

Figure 7:
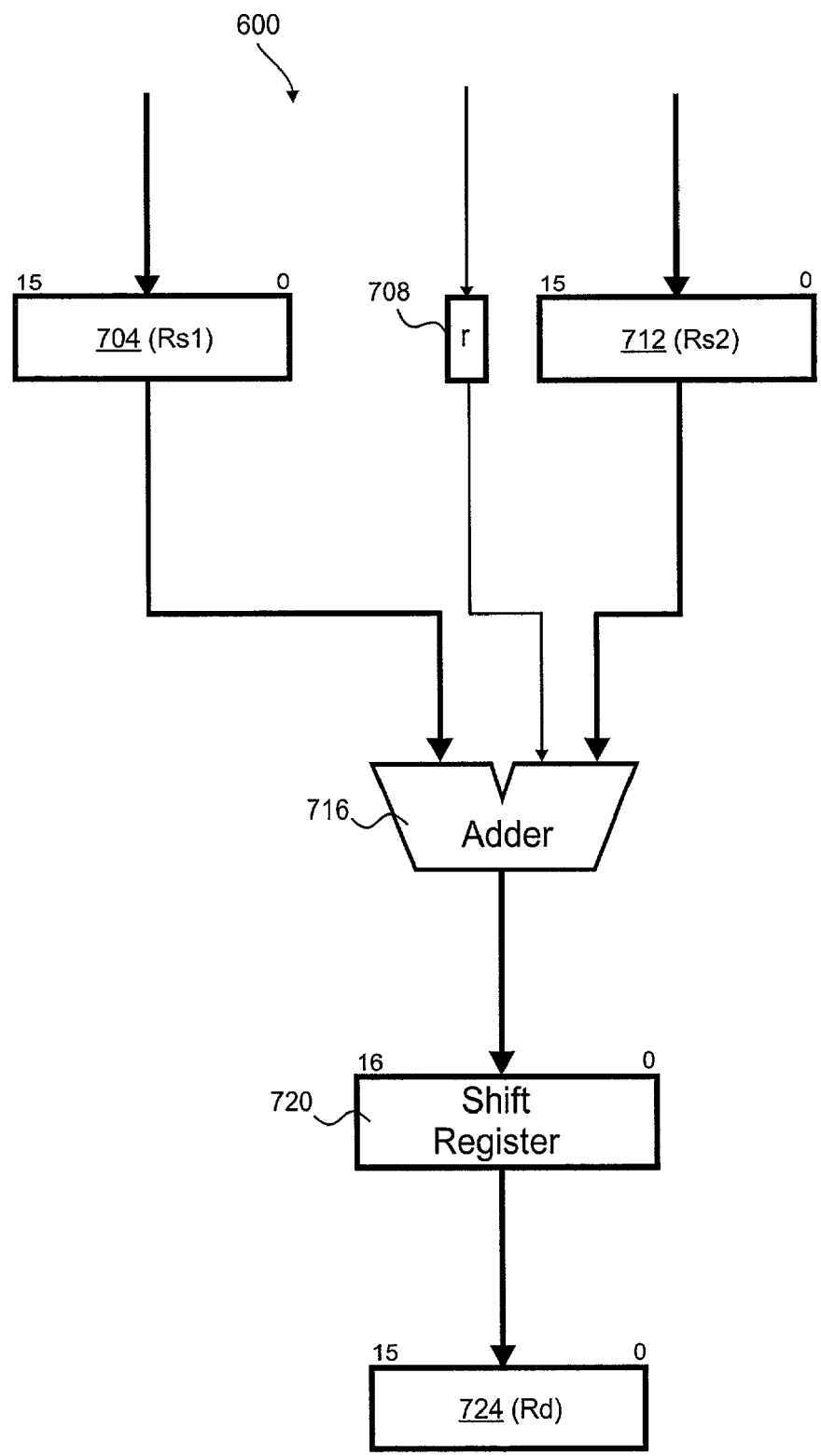
FIG. 7 is a block diagram that schematically illustrates an average module for averaging two pixels.

With reference to FIG. 7, a block diagram that schematically illustrates an average module 600 for averaging two pixel values is shown. The average module 600 takes a first and second input operands 704, 712 along with a rounding factor 708 and couples them to an adder 716. After adding, that intermediate result is coupled to a shift register 720 to produce an output operand 724. The shift register has seventeen bits to accommodate the whole intermediate result, but after the shifting, the value is truncated to the sixteen bits of the output operand 724.

The rounding factor 708 serves to either round the pixel average in two different ways depending upon the pixel average algorithm desired by the user. A rounding factor equal to one rounds the result up and a rounding factor equal to zero rounds the result down. The adder 716 sums the first input operand 704, second input operand 712 and rounding factor 708. After a single bit shift to the right in the shift register 720, the rounding factor effectively causes rounding up or down based upon its value.

Figure 8:
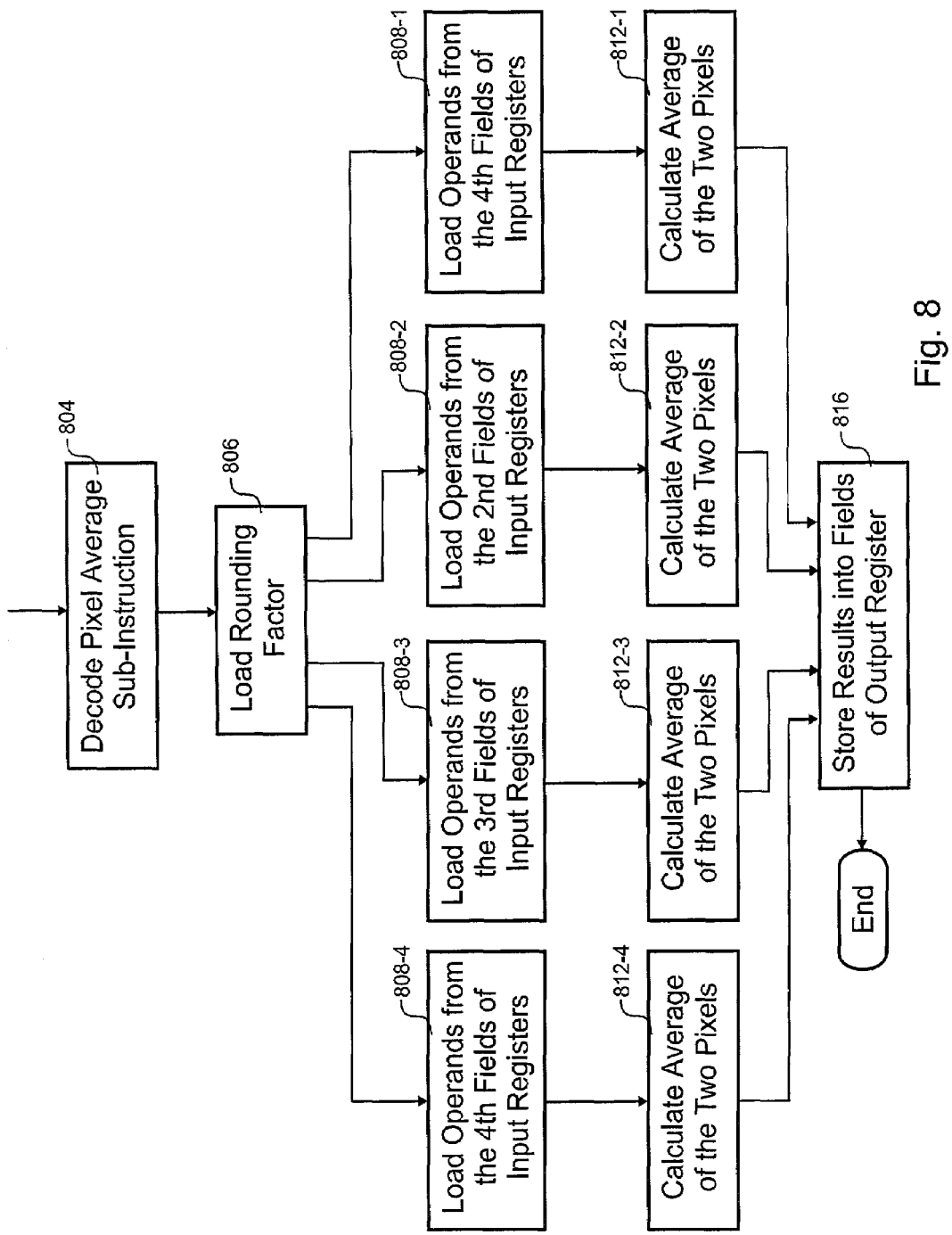
FIG. 8 is a flow diagram that illustrates an embodiment of a method for averaging four sets of pixels in parallel.

Referring next to FIG. 8, a flow diagram that illustrates an embodiment of a method for averaging four sets of pixels in parallel is shown. The process begins in step 804 where a pixel average sub-instruction is decoded. A VLIW instruction word could have a number of pixel average or other sub-instructions. During decode of the instruction, the format of the registers 508, 504 is determined by analyzing the op code portion 412 of the instruction. In this example, there are four fields in each register 508, 504. The process begins in step 806 where the rounding factor 604 is loaded. The respective fields 512, 516 of the source registers 508 and the rounding factor 604 are loaded by the separate processes of step 808. In parallel, four averages are calculated in step 812. Once all the pixel pairs are averaged in parallel, the four results are stored in their respective fields 524 of the output register 504 in step 816.

The process of FIG. 8 is described in the context of an example of processing a pair of pixels. After decode in step 804, the rounding factor 604 loaded in step 806 such that the rounding method is known. A first operand is loaded from the third field 512-3 of the first input register 508-1 and a second operand is loaded from the third field 516-3 of the second input register 508-2 in step 808-3. Once the operands 508 and rounding factor 604 are loaded, the first and second operands or pixels are averaged in step 812-3. The resulting pixel average is stored in the third field 524-3 of the output register 504 in step 816 to complete the pixel average function for one pair of pixels.

Figure 9:
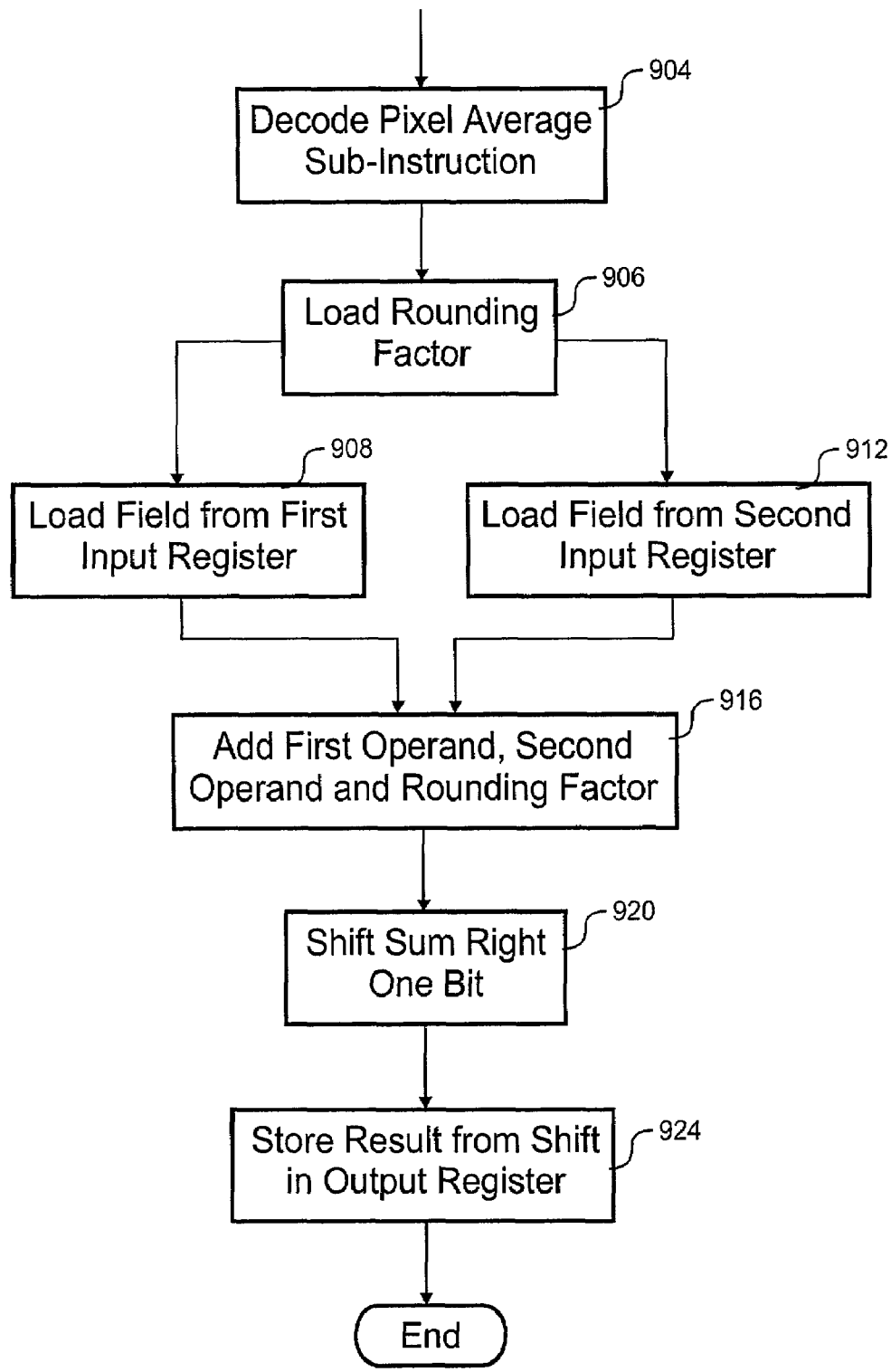
FIG. 9 is a flow diagram that shows an embodiment of a process for calculating an average of two pixels.

With reference to FIG. 9, a flow diagram that shows an embodiment of a process for calculating an average of two pixels is shown. The process begins in step 904, where a pixel average sub-instruction is decoded from a VLIW instruction word. In step 906, a rounding factor 604 is loaded to determine the rounding technique to use. In parallel, respective fields 512, 516 are loaded from the first and second input registers 508 to get two pixel values. In step 916, two pixel values and the rounding factor 604 are summed to produce an intermediate result. The intermediate result is shifted right one bit in step 920. After calculation of the final result in step 920, that result is stored in the proper field 524 of the output register 504 in step 924.

Although the above description averages two pixels with equal weighting, other weightings could be used. For example, a three-quarter weighting of one pixel and a one-quarter weighting of the other could be used. This could be achieved by two pixel average instructions where the result of the first pixel average is used in the second average as an input operator. Using successive pixel average operations in this manner allows doing motion correction for image stabilization or MPEG encoding.

Conclusion

In conclusion, the present invention provides a novel computer processor chip having a sub-instruction for performing parallel pixel average functions that allows performing several of these functions in a single issue. Additionally, different rounding methodologies are possible in the pixel average function to accommodate different algorithms. While a detailed description of presently preferred embodiments of the invention is given above, various alternatives, modifications, and equivalents will be apparent to those skilled in the art. For example, while the above embodiments may use unsigned data types, other embodiments could use other data types such as a signed data type. Therefore, the above description should not be taken as limiting the scope of the invention that is defined by the appended claims.

What is claimed is:

1. A method for averaging two pixel values, comprising:
   decoding a single machine code instruction comprising an address for a first input register, an address for a second input register, an address for an output register, an op code indicating a function to perform, and a rounding factor;
   loading a plurality of first operands from the first input register;
   loading a plurality of second operands from the second input register;
   producing an average, based on the op code, of one of the plurality of first operands and one of the plurality of second operands, wherein the rounding factor indicates which of a plurality of rounding algorithms to use in producing the average, the plurality of rounding algorithms comprising:
     a first rounding algorithm able to produce a change in the average; and
     second rounding algorithm able to produce a change in the average; and
     storing the average in the output register.

2. The method of claim 1, further comprising determining how many fields are in each of the first and second input registers.

3. The method of claim 1, wherein the producing the average comprises:
   producing a first intermediate result by adding one of the plurality of first operands to one of the plurality of second operands; and
   producing the average by shifting the first intermediate result to the right by one binary digit.

4. The method of claim 1, wherein the producing the average comprises:
   producing a first intermediate result by adding one of the plurality of first operands, one of the plurality of second operands and the rounding factor; and producing the average by shifting the first intermediate result to the right by one binary digit.

5. The method of claim 1, further comprising rounding the average before storing the average.

6. The method of claim 1, further comprising:
evaluating the rounding factor; and
adding a value to the average.

7. The method of claim 6, wherein the value is one of zero and one.

8. A method for avenging two pixel values, comprising:
decoding a single machine code instruction indicating an address for a first input register, an address for a second input register, an address for an output register, an op code indicating a function to perform, and a rounding factor;
loading a first operand from an A1 field of the first input register;
loading a second operand from a B1 field of the second input register;
producing an average, based on the op code, of the first operand and the second operand, wherein the rounding factor indicates which of a plurality of rounding algorithms to use in producing the average, the plurality of rounding algorithms comprising:
a first rounding algorithm able to produce a change in the average; and
a second rounding algorithm able to produce a change in the average; and
storing the average in a C1 field of the output register.

9. The method of claim 8, wherein the instruction is one of a plurality of instructions in a long instruction word.

10. The method of claim 8, further comprising determining how many fields are in each of the first and second input registers.

11. The method of claim 8, wherein the producing an average comprises:
producing a first intermediate result by adding one of the plurality of first operands to one of the plurality of second operands; and
producing the average by shifting the first intermediate result to the right by one binary digit.

12. The method of claim 8, wherein the producing an average comprises:
producing a first intermediate result by adding one of the plurality of first operands, one of the plurality of second operands and the rounding factor; and
producing the average by shifting the first intermediate result to the right by one binary digit.

13. The method of claim 8, further comprising:
evaluating the rounding factor; and
adding a value to the average.

14. The method of claim 13, wherein the value is one of zero and one.

15. The method of claim 8, wherein the first input register comprises a plurality of fields.

16. The method of claim 8, further comprising rounding the average before storing the average.

17. The method of claim 8, further comprising:
loading a third operand from an A2 field of the first input register;
loading a fourth operand from a B2 field of the second input register;
producing a second average of the third operand and the fourth operand; and
storing the second average in a C2 field of the output register.

18. A pixel averaging apparatus, comprising
a first input register comprising a plurality of first fields;
a second input register comprising a plurality of second fields;
a rounding factor indicated by a single machine code instruction;
a plurality of average modules respectively coupled to the first and second fields, the modules configured to perform an averaging function indicated by an op code in the single machine code instruction; and
an output register comprising a plurality of third fields, wherein:
the third fields are respectively coupled to the plurality of average modules, and
the rounding factor affects how the plurality of average modules round results to produce an average,
wherein:
the single machine code instruction comprises an address for the first input register, an address for the second input register, an address for the output register, the op code, and the rounding factor; and
the rounding factor indicates which of a plurality of rounding algorithms to use in producing the average, the plurality of rounding algorithms comprising:
a first rounding algorithm able to produce a change in the average; and
a second rounding algorithm able to pproduce a change in the average.

19. The pixel averaging apparatus of claim 18, wherein the average module comprises:
a plurality of adders respectively coupled to the first and second fields; and
a plurality of shifters respectively coupled to the plurality of adders.

20. The pixel averaging apparatus of claim 18, wherein the rounding factor causes at least one of rounding-up or rounding-down by the plurality of average modules.

21. The pixel averaging apparatus of claim 18, wherein the rounding factor is added to the first and second fields in the average module.

* * * * *